US007509297B2

(12) United States Patent
Kerisit

(10) Patent No.: US 7,509,297 B2
(45) Date of Patent: Mar. 24, 2009

(54) EDITING PROCESS FOR AN EXPLANATORY MODEL

(75) Inventor: Jean-Marc Kerisit, Paris (FR)

(73) Assignee: Intercim, Paris (FR)

( * ) Notice: Subject to any disclaimer, the term of this patent is extended or adjusted under 35 U.S.C. 154(b) by 56 days.

(21) Appl. No.: 11/026,091

(22) Filed: Jan. 3, 2005

(65) Prior Publication Data

US 2006/0089923 A1 Apr. 27, 2006

Related U.S. Application Data

(60) Provisional application No. 60/533,231, filed on Dec. 31, 2003.

(51) Int. Cl.
*G06F 17/00* (2006.01)
*G06F 15/18* (2006.01)
*G06N 5/02* (2006.01)
*G06N 5/04* (2006.01)

(52) U.S. Cl. .............................. 706/47; 706/14; 706/60

(58) Field of Classification Search .................... 706/1, 706/4, 10, 14, 45–48, 52, 900, 902, 903, 706/906, 911, 914, 60
See application file for complete search history.

(56) References Cited

U.S. PATENT DOCUMENTS 5,398,187 A * 3/1995 Yamada et al. .............. 600/544

5,398,300 A * 3/1995 Levey ......................... 706/46
5,619,621 A * 4/1997 Puckett ........................ 706/45
7,072,841 B1 * 7/2006 Pednault ...................... 706/12
2001/0029499 A1 * 10/2001 Tuatini et al. ................. 706/47

OTHER PUBLICATIONS

Lou,Z. et. al. "Road Surface Crack Condition Forecasting Using Neural Network Models" 1999.*
Lisboa,P.J.G. et. al. "A Bayesian Neural Network Approach for Modelling Censored Data With an Application to Prognosis After Surgery for Breast Cancer" May 2003.*
Yang,J. et. al. "Application of Neural Network Models for Forecasting of Paevement Crack Index and Pavement Condition Rating" Mar. 2003.*

* cited by examiner

*Primary Examiner*—David R Vincent
*Assistant Examiner*—Benjamin Buss
(74) *Attorney, Agent, or Firm*—Oblon, Spivak, McClelland, Maier & Neustadt, P.C.

(57) ABSTRACT

An editing process for an explanatory model includes a step for producing the explanatory model in the form of a set of rules. The rules are represented by logical combinations of elementary premises, each elementary premise including a restriction of the field of the variable. The rules are also represented by a logical combination of elementary conclusions, each elementary conclusion also including a restriction of the field of a variable. The process also includes a step for modifying at least a part of the initial rules, to determine a new explanatory model. The step for modifying the rules includes modifying the restrictions of the field of the variables, and calculating the quality indicators for the rule by applying the modified set of rules to a data source called the examples basis.

18 Claims, 6 Drawing Sheets

Figure 1:
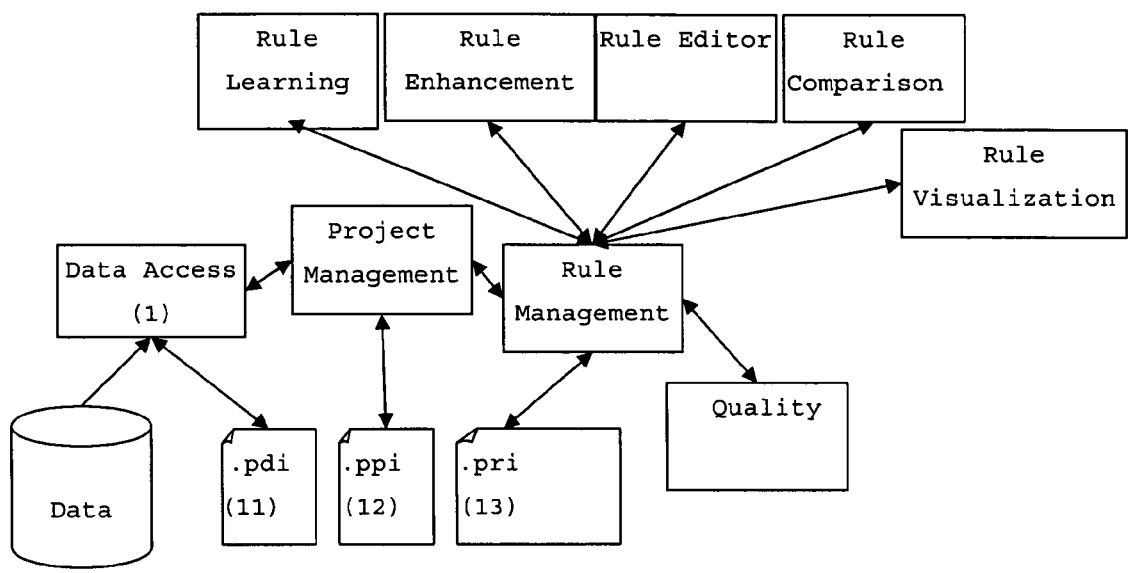

```
Variable    Type    Description
classes     list    Distinct classes of the learning base (global).
usePerClassPurity bool User flag for the class purity (global).
bCSToll     double  Limit parameter for the basis construction success (global).
perBSNbIterations unsigned   Parameter of the number of tests by basisSize
value (global).
pcBasisSize         unsigned  Re-definition of the basisSize by class, eval-
uated in the preparation of the algorithm (global).
pcMaxBasisSize      unsignedMax. value of basisSize for each class: this is
the number of instances of the class (global).
pcImpurity          unsigned  re-definition of impurity by class (global).
pcNbIterations      unsigned  Number of iterations by class (global).
pcNbGoodBases       unsigned  Number of fertile bases found for each class
                                                                (global).
Algorithm  Ctau28a  : : evaluateBasisSize
1.
2. (double) nbMinSuccess this.perBSNbIterations * this.bCSToll
3. (double) nbMinFailure this.perBSNbIterations * (1 - this.bCSToll)
4.
5. /* Evaluate BCS for each class */
6. for cl 0 to this.classes.size()
7.   do
8.      (list) instance this.learningSet.getInstances(classes(cl)) /* recovery
of the examples of the class cl */
9.      (unsigned) limInf 2
10.     (unsigned) limSup this.pcBasisSize(classes(cl))
11.
12.     while limInf < limSup
13.     do (unsigned) nbGoodBases 0
14.        (unsigned) nbWrongBases 0
15.        (int) res 0
16.
17.  /* Evaluate BCS for current basis size value */
18.     for i 0 to this.perBSNbIterations
19.     do
20.        if this.testOneBasis(this.pcBasisSize(classes(cl)), 0, instances)
21.           then ++nbGoodBases
22.           else ++nbWrongBases
23.
```

*Fig.2A*

AUTOMATIC DETECTION OF THE PSEUDO CODE GRANULARITY

```
24.      if (nbGoodBases == nbMinSuccess) and (nbWrongBases == nbMinFailure)
25.         then res 0
26.         break
27.      if (nbGoodBases >= nbMinSuccess)
28.         then res 1
29.         break
30.      if (nbWrongBases >= nbMinFailure)
31.         then res -1
32.         break
33.
34. /* if good BCS, increase basis size */
35.      if res > 0
36.         then if this.pcBasisSize(this.classes(cl)) == limSup
37.            then break
38.         limInf this.pcBasisSize(this.classes(cl))
39.         (unsigned) newBasisSize = this.pcBasisSize(this.classes(cl)) +
(1 + limSup - limInf) / 2
40.         this.pcBasisSize(this.classes(cl)) newBasisSize
41.
42. /* if wrong BCS, decrease basis size */
43.      if res < 0
44.         then if this.pcBasisSize(this.classes(cl)) == limInf
45.            then break
46.         limSup this.pcBasisSize(this.classes(cl)) - 1
47.         (unsigned) newBasisSize = this.pcBasisSize(this.classes(cl)) -
(limSup - limInf) / 2 + 1
48.         this.pcBasisSize(this.classes(cl)) newBasisSize
49.
50. /* exactly good BCS */
51.      if res == 0
52.         then break
53.
```

The role of the testOneBasis function is to construct randomly a generalisation basis among the instances given, and to test its validity with respect to the impurity criterion provided.

*Fig.2B*

AUTOMATIC DETECTION OF THE PSEUDO CODE GRANULARITY

EDITING PROCESS FOR AN EXPLANATORY MODEL

This invention relates to the field of analysis and the description of observable phenomena, in particular for the construction and edition of an explanatory model, i.e. composed of a set of explanatory rules. The said process incorporates in particular within a graphical editor:

a capacity for updating, visualization and improving indicators for quality and for validation of the rules based on their assessment on a set of data, a learning capacity permitting the said rules to be obtained by integrating constraints and/or quality objectives.

In the history of knowledge modeling, the emphasis has often been placed more on the models and prediction than on the explanatory models. Undoubtedly because there are many existing techniques permitting predictions to be made, including underlying models which are unintelligible (for example neuron systems). We can therefore believe that if the explanatory models sometimes permit predictions to be made (however this should be clarified as an explanatory model must be simple in order to be intelligible, and the simplification to which this modeling proceeds therefore often tends to lower its predictive capacities), the reverse (which is to say that the predictive models permit explanations to be made) is not true.

In the state of the art, we know of a solution in the patent ("Method for generating predictive models in a computer system—U.S. Pat. No. 5,692,107") which permits predictive models to be generated based on top down and bottom up analysis engines and a knowledge data base.

This solution is not in fact a solution for the construction of an explanatory model, but simply a solution for the construction of a predictive model. An explanatory rule forms an individual autonomous piece of knowledge whose value is defined by the calculation of quality indicators (e.g. purity, strength, density, etc.) that may be calculated on a samples that is supposed to be representative of the data, whereas the predictive rules do not have values individually: they compose a global model which permits the value of a goal attribute to be predicted for fixed values of the other attributes. The quality of a predictive model is global and may be expressed as the coincidence between the prediction and the value observed on statistically representative samples.

In the U.S. Pat. No. 5,692,107, an explicit difference is made between expressed knowledge and a prediction module by rules based on a target data set modified by the user. This invention does not consider any similar prior knowledge.

Furthermore, the patented process supposes the explicit choice of the induction module by the user from a set of bottom up analysis modules, which is not at all the case in this invention.

The purpose of the invention is to propose a solution that overcomes these disadvantages which effectively allows explanatory rules to be formulated and defined.

The invention relates to, according to its most general sense, an editing process for an explanatory model comprising:

a step for producing the explanatory model in the form of a set of rules, the said rules being represented by:

logical combinations of elementary premises, each elementary premise consisting of a restriction of the field of the variable, and a logical combination of elementary conclusions, each elementary conclusion also consisting of a restriction of the field of a variable.

the process comprising moreover a step for modifying at least a part of the initial rules, to determine a new explanatory model wherein the step for modifying the rules consists of:

modifying the restrictions of the field of the said variables, and calculating the quality indicators for the rule by applying the modified set of rules to a data source called the examples basis.

Advantageously, the said quality indicators are composed of a combination of several elementary quality indicators from the following set:

rule size indicator: characterizes the number of examples of the examples basis which checks the premises of the rule, rule volume indicator: characterizes the volume of the rule support sub-space, rule purity indicator: characterizes the proportion among the samples which check the premises of the rule, of those which also check its conclusions, strength indicator: characterizes the resistance of the rule to changes.

According to one variant, the said quality indicators are defined by the user by means of a graphical interface.

According to one advantageous embodiment, the process comprises an operation for improving the rule consisting of maximizing one or more quality indicators by the optimal determination of the field of variation of one of the variables of the premises of the said rule.

According to variants of the embodiment, the process of the invention comprises:

an operation for improving a rule consisting of maximizing one or more quality indicators by the optimal determination of the field of variation of one of the variables of the premises of the said rule, an operation for improving a rule consisting of adding at least an additional premise in the aim of maximizing one or more quality indicators by the optimal determination of the field of variation of the variables of the premises of the said rule.

a rule enhancement operation consisting of eliminating at least premise of the said rule in the aim of maximizing one or more quality indicators by the optimal determination of the field of variation of the variables of the premises of the said rule.

a visualization step of a graphical representation of the field of variation of the variables, and graphical symbols representative of the data of the reference source and the result of the application of the rule to the examples basis, and a modification step for the field of the variables by graphical positioning of the markers commanded by actuation on a peripheral pointing device.

According to another variant, the process comprises among others a step of:

recalculation in real time of at least one quality indicator, and graphical visualization of the said quality indicator.

According to another variant, it comprises among others a visualization step of a graphical representation of the field of the space composed by the projection of the quality and positioning indicators in the said space of graphical symbols representative of the rules according to the indicators corresponding to each of the rules.

Advantageously, it comprises among others means of selection and visualization of the said rules with the aid of a peripheral pointing device.

According to one particular embodiment, the process comprises among others a step for constructing an additional rule by the graphical representation of a set of rules and the calculation of an additional rule resulting from a uniting combination of several rules.

Preferably, the selection of two rules to be combined comprises an operation of graphical representation of the rules and the values of the quality indicators corresponding to the combination of each pair of rules.

According to one variant, the step for constructing the rules consists of drawing up the set of rules by learning all or part of the examples basis, taking account of the constraints expressed on one or more indicators of quality and validity.

Advantageously, the rules drawn up bear solely on certain variables from the entire set of variables possible.

Preferably, the rules drawn up take into account the constraints expressed on the fields of variation of the variables.

According to one variant, the rules drawn up optimize one or more quality and validity indicators.

According to one specific embodiment, the fields of variation of the variables appearing as a premise of a first rule are viewed in the form of histograms.

According to one specific embodiment, the fields of variation of the variables appearing as a premise of a first rule can be modified by actuating the peripheral pointing device on the said histograms.

The invention will be easier to understand upon reading the following description, referring to a non-restrictive example of an embodiment.

DESCRIPTION OF THE APPLICATION COMPUTER ARCHITECTURE

The system described is based around the software architecture of which an example is shown in FIG. 1.

It is composed of:
a data access module (1).
a project management module (2).
a rule management module (3).
a calculation module for the quality indicator values of a rule (4).
an automatic learning module (5).
a rule enhancement module (6).
a rule editor module (7).
a rule comparison module (8).
a rule visualization module (9).

Data Access Module (1)

This data access module (1) is designed to read and write historical data in the form of a flat text file (.csv format), an Excel file or an ODBC request to a data base. This historical data (10) is information corresponding to the examples (also called lines or points) from which the rules will be created and validated. These variables may be of an ordinate nature (e.g. using numerical values) or a non-ordinate nature (e.g. using discrete text values).

This information is for example composed of an external table comprising for each example experimental variable values as well as an output variable for which we are trying to construct the explanatory model. This output variable is, in the example described non-restrictively, a non-ordinate variable. In the case of an application bearing on the analysis of the setting of a production line, this table will comprise, for a series of tests, the setting values for each piece of equipment on the line as well as the value of the performance indicators or the measurement taken on the production line.

Its user interface offers the choice between these options and for each of them requests that the corresponding parameters be entered (e.g. name and path of the file, etc.). This data access module (1) imports historical data (10) from disparate formats, to save them to the memory or in the form of an examples file (11) in a format that may be used by the other modules.

Each project has a specific examples basis associated to it, optionally saved in file form (11) constructed by the data access module (1), with a specific extension, for example .pdi.

Project Management Module (2)

This project management module (2) accesses the historical data (10) by means of the data access module (1), as well as the rules by means of the rule management module (3), to save the work projects in "project" file form (12), with a specific format, such as .ppi for example.

Rule Management Module (3)

This rule management module (3) makes available to the other modules all of the rules available from the rule edition module (7), or the automatic learning module (5), and maintains the coherency of rules modified by the enhancement modules (6), rule edition modules (7) and rule visualization modules (9). For each rule, it keeps the quality indicators coherent by calling the calculation module of the quality indicator values (4).

This module also makes available all of these rules to the rule comparison module (8).

In the application example, a rule is defined precisely by:
a conjunction of elementary premises, each elementary premise consisting of a restriction of the field of a variable:
in the form of a variation interval for an ordinate variable,
in the form of particular value for a non-ordinate variable.
and an elementary conclusion also consisting of a restriction in the field of a variable, the said variable must be discrete (non-ordinate).

The rule management module saves these rules in the form of a rule file (13), with a specific format, for example .pri.

Calculation Module for the Quality Indicator Values of a Rule (4)

This module permits the calculation, from a rule such as that produced by the module (3) and a set of data such as that produced by the module (1), a set of quality indicator values for this rule.

Certain rule quality criteria are defined with respect to a geometrical representation of the rules which require a few preliminary explanations. By hyperspace, we mean a space with N dimensions, N representing the number of variables not included in the output variable. We call hypercube a sub-space of the hyperspace (potentially the space itself), limited by ranges of values for each variable. There is a hypercube that corresponds to each rule, which we will call the hypercube of the rule, which is defined by the restriction of the space according to the constraints expressed in the premises of this first rule. For each rule, there is a corresponding set of points among all of the points of the examples basis, called the rule support, which is defined as the set of points that belongs to the hypercube of the rule.

The quality criteria of the rules are calculated as follows:

Purity:

The degree of purity of a rule is determined by the ratio of the number of points of the rule respecting this rule (i.e. whose output value is equal to the selected value in the conclusion of the rule), on the total number of points of the rule under consideration.

For example, if a rule concluding on a "correct" value for the output variable contains 5 points, four of which have the "correct" value for the output value and the 1 point has the "incorrect" value, the purity of the rule is $4/5$, which is to say 80%.

Relative Purity

The relative purity Pr is calculated as a linear function by sections of the purity p of the rule:

Where p is the purity of the entire space with respect to the output class of the rule, If $p < P$, $Pr(p) = 0$ Otherwise, $Pr(p) = \frac{(p - P)}{(1 - P)}$ Complexity The complexity is calculated as the number of premises of the rule.

Size

The size of the rule is calculated as the number of points of the rule.

Relative Size

The relative size of the rule is calculated as the size of the rule divided by the size of the entire space.

Volume

The volume of a rule is calculated as the product of the amplitudes according to each dimension of the hypercube of variation of the variables pf the points analysed. For the discrete (non-ordinate) variables, the amplitude is calculated as the inverse of the number of modalities taken by this variable on the entire examples basis.

Relative Volume

The relative volume is calculated as the volume of the rule divided by the volume of the entire space.

Density

The density of a rule is calculated as the ratio between its relative size and its relative volume.

Strength

The strength of a rule is a statistical indicator taking into account the probability according to which this rule could be the result of pure chance (calculation based on the hyper geometrical law). Intuitively, the higher the probability that this rule exists, the lower the strength.

The strength is calculated as follows:

$$\text{Strength} = 1 - \sqrt[p]{\frac{C_N^k \times C_{\tilde{N}}^{n-k}}{C_{N+\tilde{N}}^n}}$$

Where:

n is the number of examples belonging to the rule, k is the number of examples belonging to the rule that are classed correctly (i.e. whose output value is equal to the value which appears in the conclusion of the rule), N is the total number of examples (in the entire space) of the same class as the rule, Ñ is the total number of examples of classes different from that of the rule, P is the number of premises of the rule (or complexity, as explained above).

Other Indicators:

Any combinations of the previous indicators may constitute a new indicator.

Automatic Learning Module (5)

The learning module (5) uses all or just a part of the historical data (10). Each line of the table of the historical data (10) will be qualified as a "point" in the following description. The objective of the learning module is to create rules which conclude on an output variable for which we attempt to construct an applicative model, and that is of an adequate quality with respect to the criteria mentioned by the user using the various indicators defined above. For example, the learning algorithm is used to define the rules of a size and volume that are adequate, of a satisfactory density, good strength and/or good sensitivity. In the following description, we will call output class any modality used by the said output variable. The algorithm uses in external parameters:

a minimum purity threshold: minPurity a minimum size threshold: minSize a redundancy parameter: redundancy.

Step 1: Initialisation

As a preliminary to carrying out the body of the algorithm, a certain amount of useful information must be determined: calculation of the impurity thresholds by class for each output class, determination of the redundancy threshold, determination of the basisSize.

Calculation of the Impurity Thresholds by Class

For each class, its "domination" is calculated as being the ratio between the number of points of this class to the total number of points of the different classes. If the domination of a class is greater than or equal to 1 (i.e. the class contains more than half of the points), the class impurity threshold for the said class is set to the complement of 1 of the ratio between the minimum purity threshold (MinPurity) and the domination of the said class:

$$classImpurityThreshold - 1 = \frac{minPurity}{domination}$$

Otherwise, in the case of a minority class, the class impurity threshold for the said class is set to the complement of 1 of the ratio between the minimum purity threshold (MinPurity):

classImpurityThreshold=1−minPurity

Calculation of the Redundancy Threshold

The redundancy threshold is defined as the product of the redundancy parameter multiplied by the number of points.

Determination of the Granularity

The granularity is the cardinality of the sets of points top be considered in the first step of the algorithm. This calculation of the granularity (basisSize) is extremely important as it allows the applicability of the algorithm to be ensured, in spite of the variety of possible data configurations. In fact, as explained below, the learning algorithm, its generalization phase, simplifies the rules. In this way, the higher the granularity, the more the premises are already generalized, and thus should lead to simple rules (with a low calculation cost). Inversely, the more these hypotheses are generalized, the lower the probability that these premises are verified on the examples basis (low basis construction success). The automatic determination of the granularity consists therefore of finding a compromise between high granularity (reduced calculation time) and a correct BCS (basis construction success).

FIG. 2 shows the pseudo application code of this determination.

Step 2: Creating the Rules

The second step consists of creating the sets of points (sets of lines, each line corresponding to an example of the historical base (10), sets which will be called "candidate rules". A point will be classed as "covered" by a candidate rule if it belongs to this candidate rule, it will be classed as sufficiently covered if the number of rules which cover it is equal to or greater than the redundancy threshold.

The step for creating the candidate rules consists of a creation iteration for the rules one by one from a new "grain" at each iteration.

Sub-Step 2.1: Choice of a Grain and Iteration Stop Criteria

Each candidate rule is created from a first point called "grain", which is selected at random from the points which are the least covered and are not yet sufficiently covered. The value of the output variable for this point determines the output class of the rule being created. A same point cannot be selected as a grain more than a certain number of times (insistency threshold). If the minimum for all of the points of the number of candidate rules covering the point is equal to or greater than the redundancy threshold, the iteration is stopped and the third step of the algorithm is triggered. Similarly, if the insistency threshold is exceeded for all of the points, the iteration is stopped and we move onto the third step of the algorithm.

Sub-Step 2.2: Construction of a Candidate Rule

For each grain selected, a number (equal to basisSize−1) of other distinct points are selected, so as to compose a set of basisSize points. These points are selected from the points supposed to be compatible with the grain and compatible with one another (this notion of compatibility between points is calculated and maintained in a compatibility matrix that is progressively updated as the algorithm is carried out, as specified below). To do so, the candidate rule is increased by successive iterations of one point each time, selected as the most compatible with the points already selected (grains included), which is to say maximizing the sum of the compatibility coefficients of the points already selected. Subsequently, all of the points which belong to the envelope hypercube of the candidate rule (i.e. the smallest hypercube containing the points of this candidate rule) are added to the candidate rule. An indicator called the "class impurity indicator" is then evaluated for this candidate rule (the proportion of points of the candidate rule with a output class different to the output class, with respect to the total number of points covered by the candidate rule). If this indicator is lower than the class impurity threshold of the output class, the candidate rule is abandoned otherwise it is added to the set of candidate rules retained. The compatibility matrix is consequently updated, as specified below.

The compatibility matrix permits to maintain dynamically accounting information between points two by two. It is initialised at 1 for all pairs of points, at 0.95 on its diagonal. When a candidate rule is conserved after evaluation of the class impurity indicator, all of the accounting coefficients between pairs of points of the candidate rule are multiplied by a factor of 0.99. When it is refused, all of the accounting coefficients between pairs of points of the candidate rule are multiplied by a factor equal to 0.95 if the size of the candidate rule is strictly higher than 2, and 0 otherwise.

Sub-Step 2.3: Widening/Generalization of a Rule

Each rule, when it is retained, is transformed during a widening and generalization step.

The principle of widening is to extend the limits of the variation of the continuous variables which appear in the premises of the rule, while maintaining the quality indicators within the set limits.

The principle of generalization is to try to remove one or more premises, while maintaining the quality indicators within the set limits.

This widening/generalization phase may be carried out for example by alternating widening and generalization operations.

Step 3: Combination of the Rules

Finally, the third step consists of combining the rules obtained in order to reduce their number, using the frequent item set technique, whose general principle is well known in the state of the art.

Rule Enhancement Module (6)

This module uses an algorithm used to adapt a rule with constraints of purity, volume, size, etc. This module carries out a treatment consisting of modifying the rule selected so as to favour one or more quality indicators, by the optimal determination of the field of variation of the variables. The variation of the field of a variable proceeds by widening and/or reducing the field.

We can distinguish the treatment of ordinate variables, where the notion of widening and reduction of the field is common, from that of non-ordinate variables. In the case of the non-ordinate variables, the widening takes place in a single step by elimination of the premise: the reduction of a non-ordinate variable is also made in a single step and only occurs on undefined premises (variable is absent from the rule). It consists of selecting a value at random from the existing values for this variable in the points basis.

The algorithm permits several possible enhancements to be proposed.

In a first step, it runs through the premises one by one and tests if the quality of the rule can be improved by widening or reducing the field of the corresponding variable.

In a second step, it runs through all of the variables one by one that do not appear in the rule and for each one tests if the quality of the rule can be improved by reduction of the field of the corresponding variable.

The third step carries out widening/reduction tests according to a stochastic exploration, following sub-step 2.3 of the learning module algorithm (5), as defined above.

Rule Editor Module (7)

Figure 3:
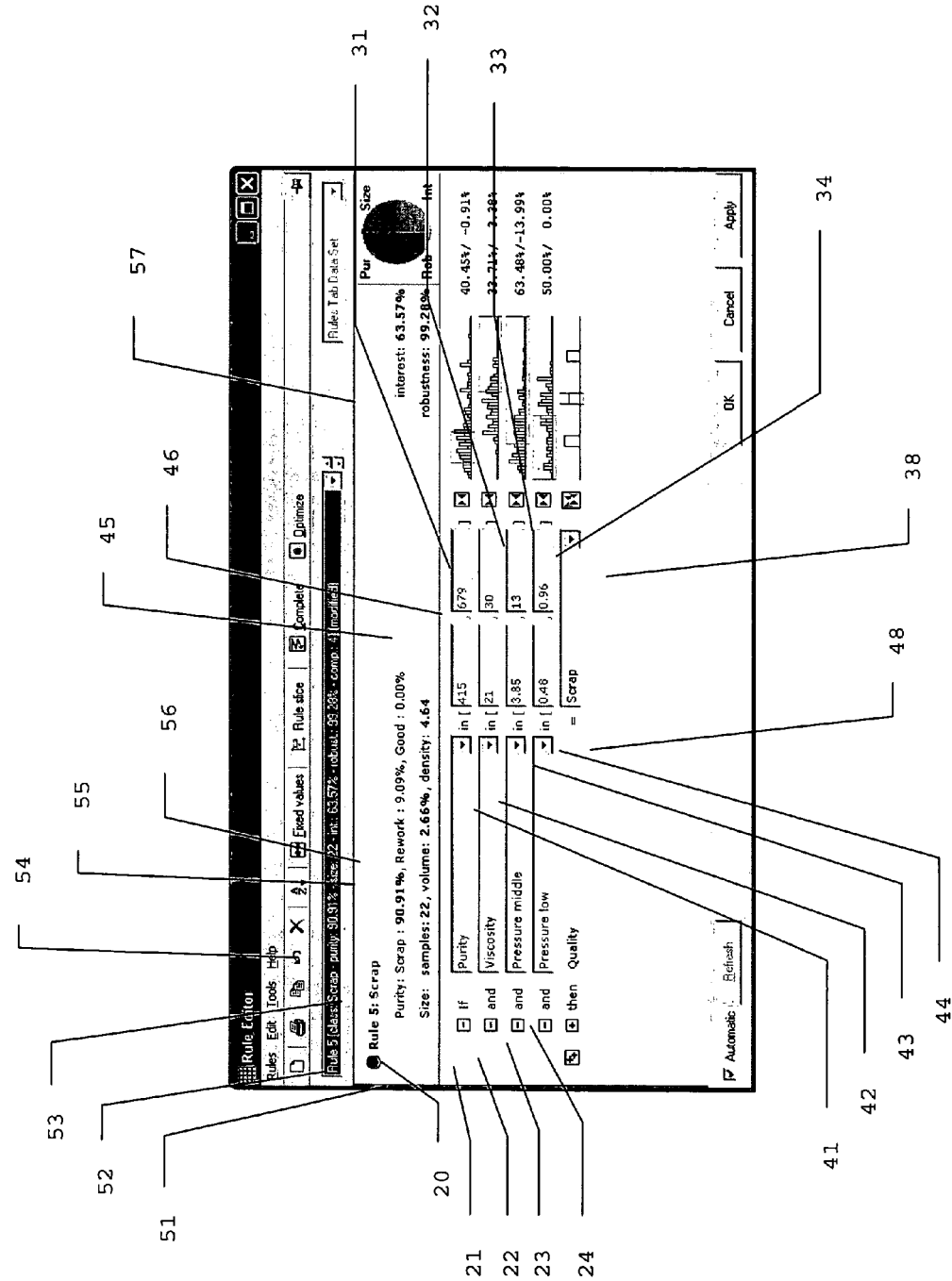

This module (7) forms a graphical user interface permitting the rules to be manipulated and modifications to be made. FIG. 3 shows a copy of a screen of an embodiment of this module. The user can select a rule and modify the field of variation of the variables. The module (7) recalculates in real time the quality indicators of the rule and displays the result of the new quality indicators resulting from the modifications imposed by the user. The result of the modifications determined by the user also causes a variation of the graphical representation of the quality indicators, in the form of a variation of the color for example.

Figure 4:
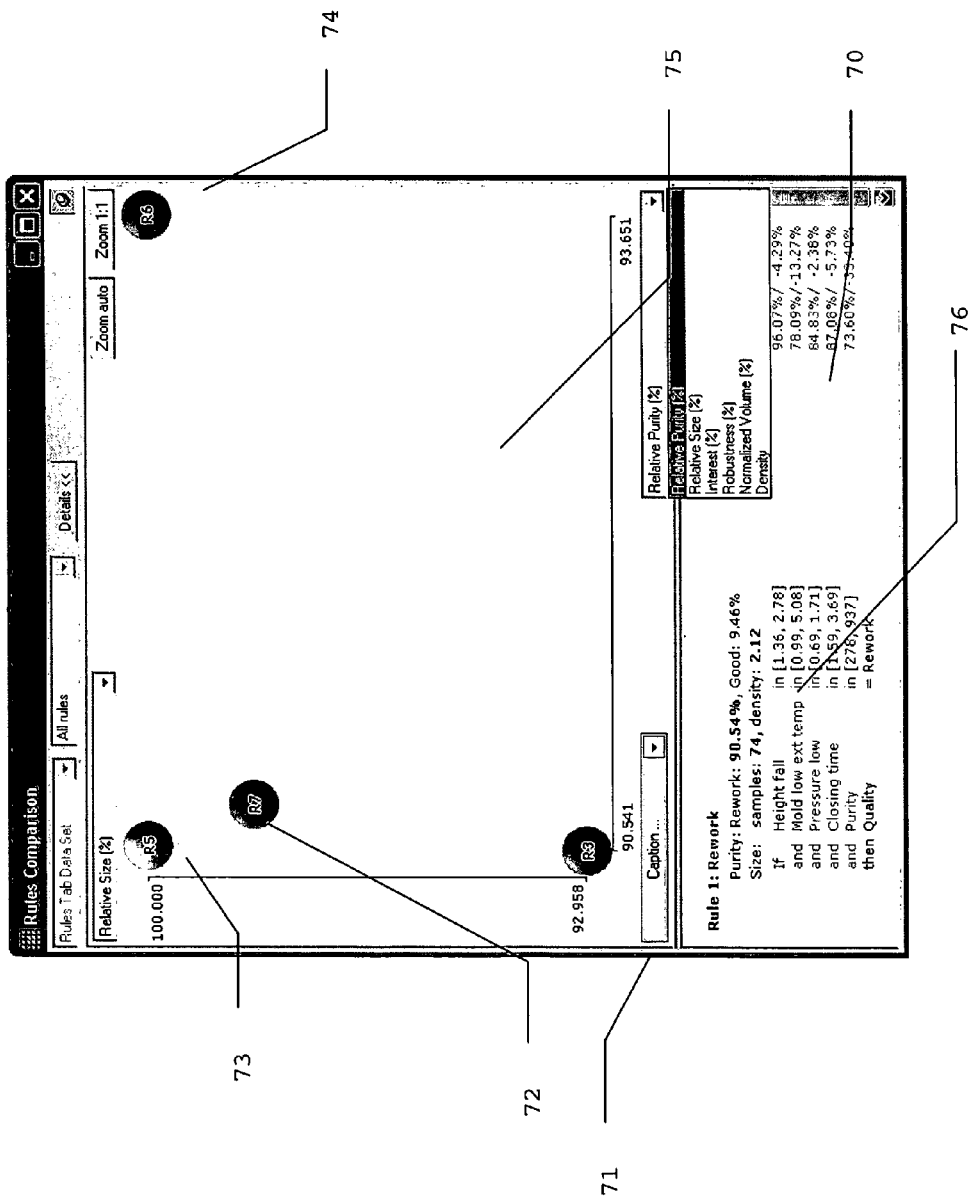

FIG. 4 illustrates an example of a screen corresponding to this module. The rule is selected by means of a roll-down menu (20). The fields of variation for each of the variables (21 to 24) used by the rule selected appear in graphical form (31 to 34) and in numerical form (41 to 44).

These elements may be modified by the user, for example by moving the indicators (45, 46) representing the limits of the variation interval on the basis of which the quality indicators were calculated, represented by numerical values (51 to 56) as well as in the form of a graphical representation (57). In this example, the value of each of the indicators is represented by color codes.

The output value is a discrete variable in this example. It is represented in graphical form (38) and in text form (48) in a roll down list. This output variable can also be modified by the user by pointing in the list to one of the discrete values represented in graphical form.

The modification of one of the values or of one of the intervals causes the recalculation of the quality indicators and the display of the new indicators corresponding to the constraints imposed by the user.

Access to the functions of the enhancement module is by means of buttons (61 to 64), which open a window permitting the corresponding enhancement algorithm to be activated, after the users have specified objectives in terms of priority and the threshold value of the constraint indicators taken into account.

Rule Comparison Module

This module permits the rules to be positioned according to the value of two quality indicators selected from the set of quality indicators. FIG. 4 shows a copy of a screen of an embodiment of this module. The choice of indicators is made by means of a roll-down list (70). Each rule (71 to 74) is positioned on a graph (75) whose axes correspond to the quality indicators selected. The designation of one of the rules of the graph permits the detail of the variables and the parameters of the rule to be viewed in a window (76).

Rule Visualisation Module

Figure 5:
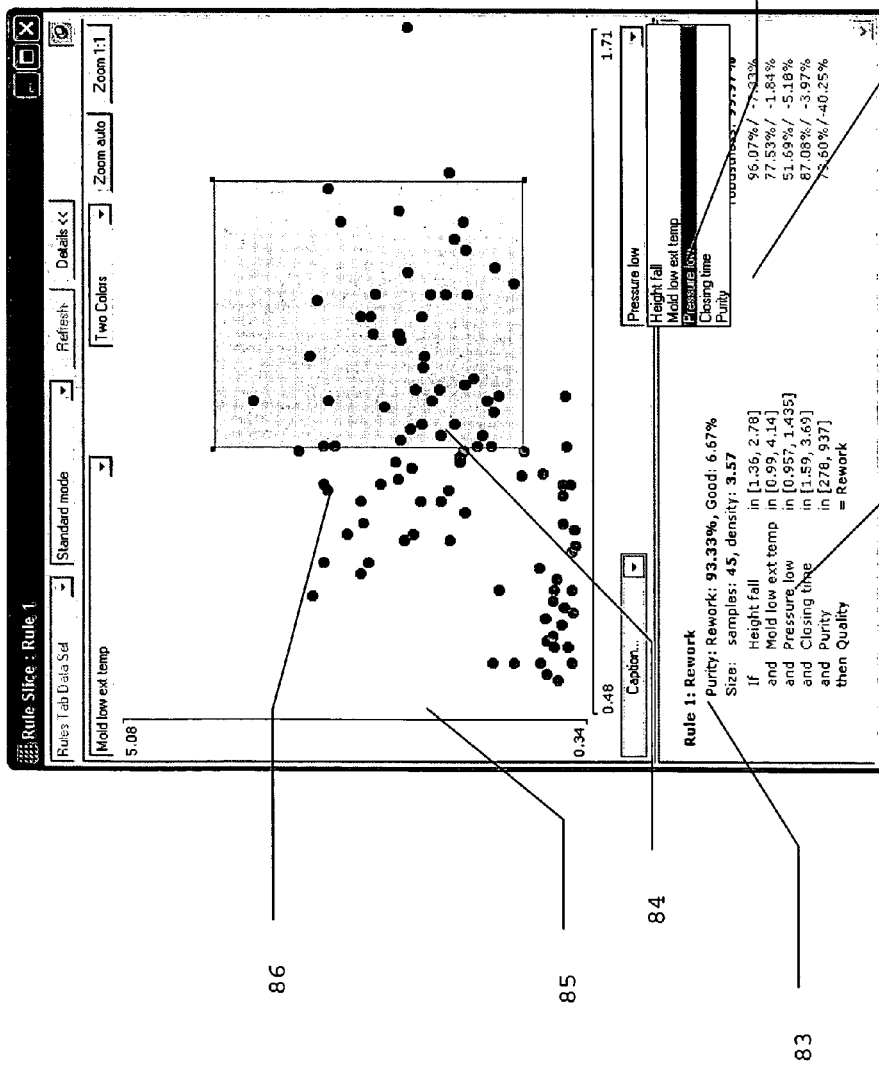

This module (8) permits a graphical representation of a rule to be displayed and manipulated. FIG. 5 shows a copy of a screen of an embodiment of this module. The rule is represented in the form of a projection of the hypercube of points on two variables selected by the user. These variables are selected by means of a roll-down list (80). The projected hypercube is shown in the form of a solid rectangle whose background is colored (81). The points are represented by small discs (for example 83 to 86) with color codes corresponding to value of the output variable. The contours of the hypercube can be modified, and in this case the rule is re-evaluated dynamically. The quality indicators are also recalculated in real time and are presented in a sub-window (82).

Data Preparation Optional Module

A prior step may be provided. This concerns the preparation of experimental data, consisting of making continuous data discrete by forming groups of discrete classes, or by filtering the experimental data and automatically or manually eliminating certain atypical or non-pertinent points, or by selecting a representative sample of points from a vaster set of experimental data.

The invention claimed is:

1. A computer-implemented method for editing an explanatory model used for analyzing and setting values associated with an operation of a production line, the method comprising:

generating, in the computer, the explanatory model in the form of a set of rules, each rule in the set of rules being represented by a logical combination of elementary premises, each elementary premise consisting of a restriction of a domain of a variable in a first set of variables, and a logical combination of elementary conclusions, each elementary conclusion consisting of a restriction of a domain of a different variable in a second set of variables;

modifying a rule in the set of rules to determine a new explanatory model, wherein modifying the rule in the set of rules includes modifying the restriction of the domain of at least one of the variables, calculating quality indicators for the modified rule by applying the modified rule to a set of data, and displaying, on a screen, the quality indicators for the rule and a graphical representation of a variation of the domain of the variables of the modified rule and displaying graphical symbols representative of the set of data;

setting values associated with the operation of the production line based on the modified rule; and storing the set of rules, including the modified rule, in a computer-readable storage medium.

2. The computer-implemented editing process of claim 1, wherein the quality indicators include a combination of several elementary quality indicators from the following set:

a rule size indicator indicating the number of examples of the set of data which satisfy the premises of the modified rule, a rule volume indicator indicating the volume of a sub-space which supports the modified rule, a rule purity indicator indicating a proportion among samples which satisfy the premises of the modified rule, of these which also satisfy its conclusions, and a robustness indicator indicating resistance of the modified rule to coincidences.

3. The computer-implemented editing process of claim 1 or 2, wherein the quality indicators are defined by a user by means of a graphical interface.

4. The computer-implemented editing process of claim 1 or 2, wherein the editing process includes an operation for improving the modified rule consisting of maximizing one or more quality indicators by the optimal determination of the domain of variation of one of the variables of the premises of the modified rule.

5. The computer-implemented editing process of claim 1 or 2, wherein the editing process includes an operation for improving the modified rule consisting of adding at least an additional premise in the aim of maximizing one or more quality indicators by the optimal determination of the domain of variation of the variables of the premises of the modified rule.

6. The computer-implemented editing process of claim 1 or 2, wherein the editing process includes a rule enhancement operation including eliminating at least a premise of the modified rule to maximize one or more quality indicators by the optimal determination of the domain of variation of the variables of the premises of the modified rule.

7. The computer-implemented editing process of claim 1 or 2, further comprising:

recalculating in real time at least one quality indicator; and graphically displaying the quality indicator.

8. The computer-implemented editing process of claim 1 or 2, wherein the editing process includes displaying a graphical representation of the set of rules in a rule space, by projecting them on dimensions defined by the quality indicators, and positioning graphical symbols representative of the set of rules in the rule space.

9. The computer-implemented editing process of claim 1 or 2, further comprising:

selecting and displaying one of the rules from the set of rules with the aid of a peripheral pointing device.

10. The computer-implemented editing process of claim 1 or 2, wherein the editing process includes constructing an additional rule in the set of rules by combining at least two rules from the set of rules and graphically representing the set of rules including the additional rule.

11. The computer-implemented editing process of claim 10, wherein the combining of the at least two rules includes graphically representing the at least two rules and the values of the corresponding quality indicators of the at least two rules.

12. The computer-implemented editing process of claim 11, wherein the additional rule is constructed automatically based on one or more indicators of quality and validity.

13. The computer-implemented editing process of claim 12, wherein the additional rule that is constructed is based on certain variables from the first set of variables.

14. The computer-implemented editing process of claim 12, wherein the additional rule is based on constraints on variation of domains of the first set of variables.

15. The computer-implemented editing process of claim 12, wherein the additional rule optimizes one or more quality and validity indicators.

16. The computer-implemented editing process of claim 1 or 2, wherein a domain of a variable from the first set of variables appearing in a premise of a rule from the set of rules is viewed in the form of a histogram.

17. The computer-implemented editing process of claim 16, wherein the domain of the variable from the first set of variables appearing in a premise of the rule can be modified by moving a peripheral pointing device within the histogram.

18. The computer-implemented editing process of claim 1, wherein the step of setting values associated with the operation of the production line includes setting values of at least one piece of equipment on the production line.

* * * * *